United States Patent [19]

Ahmed

[11] 3,816,761

[45] June 11, 1974

[54] COMPARATOR CIRCUITRY

[75] Inventor: Adel Abdel Aziz Ahmed, Clinton Twp., County of Hunterdon, N.J.

[73] Assignee: RCA Corporation, New York, N.Y.

[22] Filed: Jan. 2, 1973

[21] Appl. No.: 320,634

[52] U.S. Cl. .............. 307/235 R, 307/247, 307/291, 328/196, 328/206

[51] Int. Cl. .............. H03k 5/20, H03k 3/12

[58] Field of Search .............. 307/235, 291, 247; 328/146, 147, 206, 196

[56] References Cited

UNITED STATES PATENTS

| | | | |
|---|---|---|---|
| 3,582,974 | 6/1971 | Favin et al. | 307/235 R |
| 3,593,035 | 7/1971 | Martens | 307/235 |
| 3,639,779 | 2/1972 | Garrigus | 307/235 X |
| 3,725,795 | 4/1973 | Mesenhimer | 307/235 X |

*Primary Examiner*—John Zazworsky

[57] ABSTRACT

A dead-zone comparator includes first and second component voltage comparators used respectively to compare an input signal to a high reference level and to a low reference level, which reference levels may be programmable. A bistable is set by the output signal of one comparator and reset by the output signal of the other. These SET and RESET signals are opposite polarity currents, one of which is more severely constrained in value than the other, and are applied via a common SET-RESET buss to the bistable.

13 Claims, 1 Drawing Figure

PATENTED JUN 11 1974 3,816,761
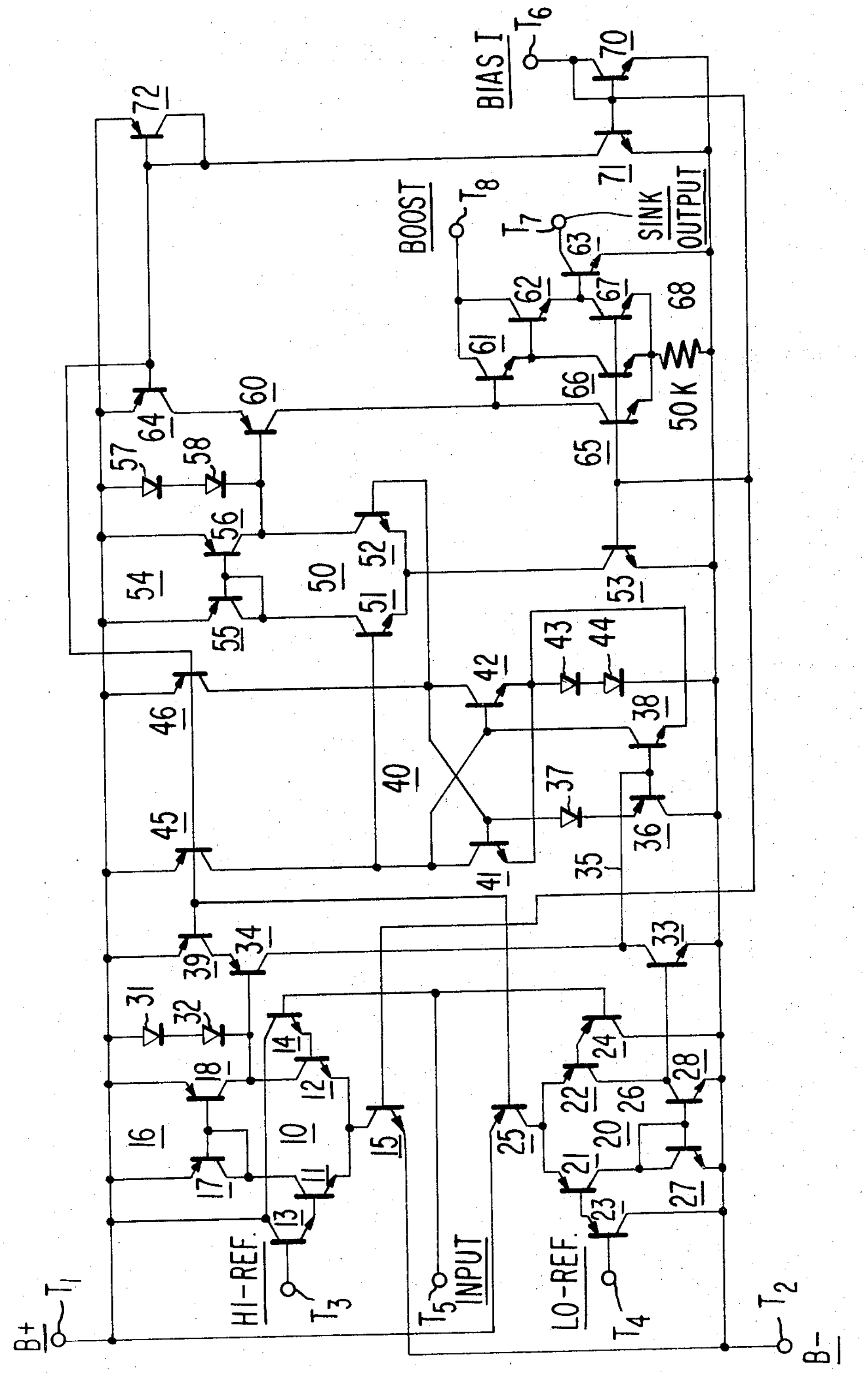

COMPARATOR CIRCUITRY

The present invention relates to comparator circuits suited for construction in integrated circuit form and for operation as programmable dead-zone comparators.

A dead-zone comparator compares an input signal potential both to a high reference level potential and to a low reference potential, the former presumably more positive than the latter. If the input signal potential is more positive than the high reference level potential, the output signal of the comparator is in a first state—that is, at a first output level. If the input signal potential is more negative than the low reference level potential, the output signal of the comparator is in a second state—that is, at a second output level different from the first. If the input signal lies between the high and low reference potentials—that is, in the dead-zone—there is no change in the state of output signal from its prior condition. Such dead-zone is useful in making the comparator insensitive to low-level noise or spurious signals accompanying the desired components of the input signal.

To provide the dead-zone feature, a bistable memory element—such as a "bistable" (or Eccles-Jordan circuit) employing a pair of transistors with cross-coupled collector and base electrodes—is employed in the comparator. When the input signal potential is more positive than the high reference level potential the bistable is set into its first stable state. When the input signal potential is more negative than the low reference level potential, the bistable is reset into its second stable state.

In a programmable comparator where the high and low reference levels may be changed at will by circuitry outside the integrated circuit, occasionally mis-programming may occur, in which the high reference level will be erroneously set at a potential less positive than the low reference level. This is particularly true where the high and low reference levels are set up to be nearly alike and, as referred to a common reference potential, are much larger than the difference between them (the dead-zone). It is necessary that in such instance, the SET and RESET signals simultaneously applied to the bistable cannot cause the bistable output signals to be hung up at some intermediate value between the levels associated with its stable states. It is necessary that the comparator be free from the possibility of latch-up of the bistable when SET and RESET signals are simultaneously applied, latch-up being a condition where the bistable is irretrievably placed into one of its stable states and is thereafter unresponsive to SET and RESET signals. The predictability of the output signal from the comparator as the dead-zone is traversed should be unaffected by the mis-programming.

The present application is directed to comparator circuitry providing a solution to the problem discussed above as well as a number of others, as described in the detailed discussion which follows.

An aspect of the present invention reposes in dead-zone comparator circuitry in which SET and RESET signals are provided via a single buss to the bistable, one being provided in response to input signal level being more positive than a high reference level and the other responsive to input signal level being more negative than a low reference level. The SET and RESET signals are of opposite polarity and one is more severely constrained in maximum value than the other. The bistable includes circuitry to separate the SET signals from the RESET signals.

Another aspect of the present invention reposes in the elimination of the problem of partial response in the comparator output to SET and RESET signals insufficiently large to completely toggle the bistable. A voltage comparator monitors the state of the bistable and provides output signals with transitions occuring only when the bistable unequivocally changes state.

The SOLE FIGURE is a schematic diagram of comparator circuitry embodying the present invention.

Referring to the FIGURE, terminals $T_1$ and $T_2$ are adapted for connection to the positive and negative terminals, respectively, of a source of energizing potential. The busses connected to terminals $T_1$ and $T_2$ will be referred to as B+ and B–, busses respectively; and the potentials applied to terminals $T_1$ and $T_2$ will be referred to as B+ and B–, respectively. Terminals $T_3$ and $T_4$ are adapted for connection to high reference and low reference potentials, respectively, each intermediate to the B+ and B– potentials. The high reference potential is normally chosen to be more positive than the low reference potential. Input signal potential to be compared to the high and low reference potentials is applied to terminal $T_5$.

Terminal $T_6$ is coupled by an external resistor (not shown) to a source of potential more positive than B– potential. The resistance of this external resistor is chosen to determine the level of current flows through parts of the comparator circuitry, as is further explained hereinafter. Terminal $T_7$ provides a current sink to terminal $T_2$ for one of the two output states of the comparator circuitry and may be coupled, for instance, to the gate electrode of a silicon controlled rectifier switching device (not shown). Terminal $T_8$ is coupled by an external resistor (not shown), to a source of potential more positive than B– potential, to determine the amount of current which can be sinked through terminal $T_7$, as will be explained further hereinafter.

First and second component voltage comparators 10, 20 are used for comparing the input signal to the high reference potential and to the low reference potential, respectively. The voltage comparator 10 primarily comprises an emitter-coupled differential amplifier comprising NPN transistors 11, 12. The high reference potential and input signals are applied to the base electrodes of the transistors 11 and 12, respectively, via NPN common-collector amplifier transistors 13 and 14, respectively. The operating currents of the transistors 11, 12 are determined by the collector current of the NPN transistor 15. A current mirror amplifier 16, comprising the diode-connected NPN transistor 17 and the PNP transistor 18, provides active collector loads for the comparator transistors 11, 12.

When the input signal at $T_5$ becomes more positive than the high reference level potential at $T_3$, the potential at the joined collector electrodes of transistors 12 and 18 becomes less positive. It drops until clamped by the serially connected diodes 31, 32 to a potential $2V_{BE}$ less positive than B+ potential. ($V_{BE}$ is the offset potential across the forward-biased base-emitter junction of a transistor or, insofar as this specification is concerned, across an integrated circuit diode). This clamping action prevents saturation of transistor 12.

The construction of the component voltage comparator 20 is similar to that of the component voltage comparator 10, except for the use of PNP transistors instead of NPN and vise versa. The components 21, 22, 23, 24, 25, 26, 27 and 28 have their counterparts in components 11, 12, 13, 14, 15, 16, 17 and 18, respectively. When the input signal at $T_5$ becomes more negative than the low reference potential at $T_4$, the potential at the joined collector electrodes of transistors 22 and 28 becomes more positive, rising above B− potential by one $V_{BE}$. The base-emitter junction of transistor 33 clamps the potential at the joined collectors of transistors 22 and 28 to this potential to prevent saturation of transistor 22.

The voltage comparator 10 provides a negative-going signal to the base electrode of common emitter amplifier transistor 34, biasing it so as to increase the conductance of its emitter-to-collector path, whenever the input signal is more positive than the high reference potential. The voltage comparator 20 provides a positive-going signal to the base-electrode of the common-emitter amplifier transistor 33, biasing it so as to increase the conductance of its emitter-to-collector path whenever the input signal at $T_5$ is more negative than the low reference potential at $T_4$. The collector electrodes of transistors 33 and 34 are joined to drive a single buss 35.

When the transistor 33 is conductive, and transistor 34 is non-conductive, SET signal is applied via the buss 35 to the bistable 40. On the other hand, when transistor 34 is conductive, and transistor 33 in non-conductive, RESET signal is applied via the buss 35 to the bistable 40. That is, for normal programming of the comparator, when the input signal at $T_5$ is more positive than the high reference level potential, the RESET signal is applied to the bistable 40; and when the input signal is more negative than the low reference level, SET signal is applied to the bistable 40.

When the high reference level potential is misprogrammed to be less positive than the low reference potential, both SET and RESET signal currents will be applied to the single buss 35. The resultant signal provided by summing the collector currents of transistors 33 and 34 at the buss 35 can only be negative, causing the bistable 40 to be set; positive, causing the bistable 40 to be reset; or substantially zero-valued, in which case the state of the bistable 40 is unaffected. Accordingly there is no way in which SET and RESET signals can be simultaneously applied with effect upon the bistable 40. The bistable 40 will always be forced into one of its stable states by its own positive feedback or by clamping of one of the base electrodes of its component transistors 41, 42. There is no possibility of simultaneously applied analog SET and RESET signals biasing the bistable 40 so that each of its transistors 41, 42 are continuously simultaneously conductive.

When the input signal at $T_5$ lies between the reference levels, the SET and RESET signal currents will largely cancel each other, providing insufficient current to change the state of the bistable 40.

When the input signal at $T_5$ lies substantially below the low reference level, a PNP current-source transistor 39 limits the emitter current flow in the common-emitter amplifier transistor 34 and consequently, limits also the amount of RESET signal current which can be provided from its collector electrode. When the potential of input signal at $T_5$ is more negative than the low reference level, the SET signal current provided from the collector electrode of transistor 33 can predominate over the RESET signal and correct the state of the bistable 40. Therefore, while mis-programming will cause the boundaries of the dead zone to be narrowed and no longer to be of programmed size, the dead zone will not be eliminated. Furthermore, the bistable 40 will still be switched between its SET and RESET states as the input signal at $T_5$ traverses the lower reference level applied to $T_4$.

The bistable 40 comprises transistors 41, 42, which have cross-coupled collector and base electrodes. Their emitter electrodes are joined and coupled via serially connected diodes 43, 44 to the B− buss. The emitter current of the conducting one of the bistable transistors 41, 42 maintains a $+2V_{BE}$ voltage drop across the diodes 43, 44. The NPN transistors 41, 42 are shown with active collector loads provided by the constant current PNP transistors 45, 46.

The network comprising elements 36, 37, 38 is of particular interest. It separates SET and RESET signals, from each other, inverting the RESET signals in the process, for application to the base electrodes of transistors 41, 42, respectively, of bistable 40.

The negative SET signal current applied to the buss 35 when transistor 33 (but not transistor 34) is conductive, forward-biases the base-emitter junction of common collector amplifier transistor 36 (a PNP transistor) and diode 37 and is thus coupled to the base electrode of transistor 41. When the SET signal current is sufficiently large in amplitude it proceeds to clamp the base electrode of transistor 41 to within $2V_{BE}$ (the offset potential across diode 37 plus the offset potential across the base-emitter junction of transistor 37) of B− potential. Since the emitter electrode of transistor 41 is as heretofore noted at $+2V_{BE}$ with respect to B− potential, its base-emitter junction will be reverse-biased. Transistor 41 is maintained or rendered non-conductive. The bistable 40 will be in, or placed into, its SET state.

The negative SET signal current will not forward-bias the base-emitter junction of common-emitter amplifier transistor 38, an NPN transistor. Transistor 38 is therefore non-conducting during application of SET signal current to buss 35 and has no effect on the bistable 40.

The positive RESET signal current applied to the buss 35 when transistor 34 (but not transistor 33) is conductive, forward biases the base-emitter junction of NPN transistor 38, rendering it conductive. When conductive, the transistor 38 clamps the base electrode of transistor 42 to the $+2V_{BE}$ potential at the emitter electrode of transistor 42. Transistor 42 in the absence of forward bias applied to its base-emitter junction, is maintained or rendered non-conductive. The bistable 40 will be in, or placed into, its RESET state.

The positive RESET signal current will not forward-bias the base-emitter junction of PNP transistor 36. Transistor 36 and diode 37 are therefore non-conductive during application of RESET signal to buss 35 and have no effect on the bistable 40.

The bistable 40 exhibits positive feedback during transitions between its stable states initiated by application of SET and RESET signals, speeding these transitions. This positive feedback is attributable to the cross-coupling between collector and base electrode of its component transistors 41, 42. This aspect of the operation of a bistable is well-known in the art.

Diode 37 prevents the collector-base junction of transistor 42 from being forward-biased during the application of SET signal to the bistable 40, avoiding the undesirable possibility of a spurious RESET signal being simultaneously applied to the bistable 40. The diode 37 may be replaced with a resistor of suitably selected resistance.

The maximum amplitude of SET current delivered from the collector electrode of transistor 33 is limited by the collector current available from transistor 46 minus collector current flowing in transistor 42, which is driven into conduction during SET condition.

A problem is presented when the SET and RESET signals applied to the bistable 40 are not fast-rising signals. A low rising SET or RESET signal may cause a slight change in the output signal potentials at the collector electrodes of transistors 41, 42, but at the same time not initiate a change in the state of the bistable 40. This condition is undesirable, because the response in the bistable output signal to the SET or RESET signal, will appear at terminal $T_7$. If a switching device, such as a silicon-controlled rectifier, has its control electrode connected to terminal $T_7$, it could be erroneously switched by this fed-through SET or RESET signal.

To overcome this problem, the output signal potentials at the collector electrodes of transistors 41, 42 are applied to a voltage comparator 50, which is used for wave-shaping purposes. More precisely, the output signal potentials from the output transistor 40 provided in push-pull at the collector electrodes of transistors 41 and 42 are applied to the base electrodes of transistors 51 and 52, respectively. Transistors 51, 52 are connected in an emitter coupled differential amplifier configuration. The joined emitter electrodes of transistors 51, 52 have a constant current withdrawn from them to provide collector current for the NPN transistor 53. A current mirror amplifier 54, comprising a diode-connected PNP transistor 55 and a PNP transistor 56, provides active collector loads for the transistors 51 and 52.

When the signal potential applied to the base electrode of transistor 52 is more positive than that applied to the base electrode of transistor 51, the potential at the joined collector electrodes of transistors 52 and 56 will become more negative. The negative excursion of this potential from B+ potential can be no more than $2V_{BE}$ because of the clamping action of the serially connected diodes 57, 58. This prevents saturation of transistor 52.

Calculation and measurement has shown that when the transistors 41, 42 in the bistable 40 are silicon types and have common-emitter forward current gains in the range 20 to 1,000 (a range which includes nearly all the NPN transistors encountered in the production of a P-substrate integrated circuit) the bistable 40 will always complete an initiated transition between states if the potential difference between their base electrodes is less than 400 mV. Therefore, if the sensitivity of the subsequent voltage comparator 50 and the subsequent amplifier transistors 60, 61, 62 and 63 coupled thereafter is sufficiently high to switch completely in response to a difference in the base potentials of transistors 51, 52 well within this 400 mV range, ambiguities in the output signal at terminal 7 due to an admixture of SET and RESET signal components therein will be eliminated.

The absence of resistors in the base and emitter circuitry of the transistor bistable 40 aids in defining its output signal potentials precisely for the succeeding comparator 50. The output signal potentials are defined solely by the base-emitter offset potentials ($V_{BE}$'s) of matched transistors 41, 42. Difference between $V_{BE}$ potentials is well known to be amongst the most precisely defined parameters in an integrated circuit.

The output signal of the comparator 50 is applied to the base-electrode of the common-emitter amplifier transistor 60, a PNP transistor. The transistor 60 is biased into full conduction by the signal at its base electrode swinging $2V_{BE}$ more negative than B+ potential. In this condition, its emitter current is limited by the collector current available from the PNP current-source transistor 64. The collector current of transistor 60 is coupled through the cascaded common collector amplifier transistors 61, 62 to the base electrode of the grounded-emitter transistor 63. Current source transistors 65, 66 and 67 operate to "pull down" the base electrodes of transistors 61, 62 and 63, respectively, in the absence of applied forward-biasing currents. That is, the collector-to-emitter paths of the transistors 65, 66 and 67 provide paths for discharging stored base-emitter charges from the transistors 61, 62, 63 when they are removed from conduction. The resistor 68 limits the emitter and collector currents of the transistors 65, 66, 67 to the few microamperes needed for this purpose. The transistors 65, 66 and 67 can be of smaller geometry than the other NPN transistors in the integrated circuit.

The transistor 63 typically comprises several component transistor structures with joined collector electrodes, joined base electrodes, and joined emitter electrodes so as to spread dissipation over a greater portion of the integrated circuit area. The current supplied to the terminal $T_8$ determines the base current available to the transistor 63 and limits its output collector current as supplied from terminal $T_7$. The current provided to terminal $T_8$ is normally chosen no larger than necessary, thus providing the integrated circuit with a measure of protection against accidental short-circuiting of the terminal $T_7$ to potential more positive than B− potential.

Positive bias current supplied to the terminal $T_6$ will cause that certain value of $V_{BE}$ offset potential across the base-emitter junction of the transistor 70 required for its collector current to substantially equal that bias current. This $V_{BE}$ offset potential is applied to the base emitter electrodes of transistors 15, 53 and 71, causing them to have collector current flows proportional to the current applied to terminal $T_6$. This $V_{BE}$ potential is also used to supply forward-biasing to the base-emitter junctions of transistors 65, 66, 67.

The collector current of transistor 71 forward-biases the base-emitter junction of the PNP transistor 72, causing a $V_{BE}$ drop thereacross such that the collector current of transistor 72 is of substantially the same amplitude as that of transistor 71. This $V_{BE}$ potential applied to the base emitter junctions of transistors 25, 39, 45, 46, 64 biases them to have collector current flows proportional to that of transistor 72. The biasing functions described in this and the preceding paragraph are of the sort familar to integrated circuit designers.

It will be understood by those familar with integrated circuit design, that the diodes 31, 32, 37, 43, 44, 57, 58 may be constructed from transistors having the collector and base electrodes direct coupled to the collector electrodes, similar to the connection shown in conjunction with transistor 27.

The entire circuit may be constructed with its transistors replaced by counterparts of complementary conductivity type to the replaced transistors. Such a circuit would have B+ and B− potentials applied to terminals $T_2$ and $T_1$, respectively; and terminal $T_7$ would provide a current source rather than a current sink. Alternatively, the circuit can be constructed with only elements 51, 52, 53, 55, 56, 57, 58, 60, 61, 62, 63, 64, 65, 66, 67 replaced by opposite-conductivity type devices to provide a current source rather than sink at terminal $T_7$.

Another variation is to interchange the interconnections of the collector electrodes of transistors 51, 52 to the current mirror amplifier 54 and amplifier transistor 60. Then terminal $T_7$ provides a low-impedance current sink when the input signal potential at $T_5$ is more negative than low reference level and does not when the input signal potential is more positive than high reference level.

What is claimed is:

1. In combination:

first voltage comparator means for comparing an input signal level to a first reference level and providing an output signal of a first polarity and of a maximum amplitude whenever the potential of said input signal is more positive than first reference level, second voltage comparator means for comparing said input signal level to a second reference level and providing an output signal of a second polarity opposite to said first polarity and of a maximum amplitude whenever the potential of said input signal is more negative than said second reference level, one of said maximum amplitudes of output signals of said first and said second voltage comparator means being larger than the other, means for summing said output signals of said first and second voltage comparators to provide a resultant signal, a bistable connected to be responsive to SET and RESET signals provided on a single buss, which buss is coupled to receive said resultant signal, said SET signals being of said first polarity and placing said bistable into a first of its stable states, said RESET signals being of said second polarity and placing said bistable into a second of its stable states, and means for coupling an output signal from said bistable.

2. The combination as claimed in claim 1 wherein:

a first and a second transistors having cross-coupled collector and base electrodes and common emitter electrodes are included in said bistable and a third and a fourth transistors having their respective base electrodes connected to separate ones of the collector electrodes of said first and said second transistors and being further connected as an emitter-coupled differential amplifier voltage comparator are included in said means for coupling an output signal from said bistable.

3. The combination as claimed in claim 1 wherein said bistable comprises:

a first and a second transistors of a first conductivity type with cross-coupled collector and base electrodes and joined emitter electrodes, a third transistor of said first conductivity type connected as a common emitter amplifier for coupling said resultant signal to said first transistor base electrode, and a fourth transistor of a second conductivity type complementary to said first conductivity type connected as a common collector amplifier for coupling said resultant signal to said second transistor base electrode.

4. The combination as claimed in claim 3 wherein a first and a second diodes are connected serially from said joined emitter electrodes of said first and said second transistors to said third transistor electrode and are poled to be forward-biased by emitter current flowing in either of said first and said second transistors, and a third diode is connected between said third transistor emitter electrode and said first transistor base electrode and is poled to be forward-biased by emitter current flowing in said third transistor.

5. The combination of:

a first terminal adapted for application of a SET signal level and a second terminal adapted for application of a RESET signal level;

a bistable circuit having a control terminal for accepting SET and RESET signals, first and second controllable conductance devices, one connected between the first terminal and said control terminal and the other connected between the second terminal and said control terminal; and a dead-zone detection circuit responsive to an input signal for reducing the conductances of one of said controllable conductance devices when said input signal is outside of said dead-zone in one sense and for the reducing the conductance of the other of said controllable conductance devices when said input signal is outside of said dead-zone in the other sense.

6. The combination as set forth in claim 5 wherein each of said controllable conductance devices comprise a transistor, the collector-to-emitter paths of said transistors connected essentially in series between said first and second terminals and the base electrodes of said transistors coupled to said dead-zone detection circuit to receive controlling signals.

7. The combination as set forth in claim 5 wherein said dead-zone detection circuit comprises two comparators, one for producing bias controlling signal in response to said input signal exceeding one value defining the upper boundary of said dead-zone and the other for producing a second controlling signal in response to said input signal being less than a second value defining the lower boundary of said dead-zone, which said first and said second controlling signals are respectively coupled to separate ones of said base electrodes.

8. The combination of:

a pair of controllable conductance means serially connected between two terminals, one for receiving a voltage of one polarity and the other for receiving a voltage of opposite polarity;

a two state circuit connected to the connection between said two controllable conductance means responsive to a signal of said one polarity for assuming one state and of opposite polarity for assuming its other state; and comparator means coupled to said controllable conductance means responsive to an input signal for reducing the conductance of only one of said controllable conductance means when said input signal is greater than one given value and for reducing the conductance of the other of said controllable conductance means when said input signal is smaller than a second given value.

9. In combination:

a bistable responsive to SET signal to be placed into one to its two states and to a RESET signal to be placed into the other;

a dead-zone detection circuit responsive to an input signal for providing an original source of SET signal of one polarity when said input signal is outside of said dead-zone in one sense and for providing an original source of RESET signal of opposite polarity when said input signal is outside of said dead-zone in the other sense, means for additively combining original signals as provided from their said original sources of SET and RESET signals to form a resultant signal;

a single buss to which said resultant signal is applied;

means responsive to portions of said resultant signal which are of said first polarity, as taken from said single buss, to provide said SET signal to said bistable; and means responsive to portions of said resultant signal which are of said second polarity, as taken from said single buss, to provide said RESET signals to said bistable.

10. In the combination claimed in claim 9, wherein the coupling of said original sources to said means for additively combining signals includes:

means for limiting the maximum excursion of one of said original signals to a smaller value than the other of these signals.

11. In combination:

a bistable having input terminal means, being responsive to SET signal applied to its said input terminal means for assuming a first of its stable states, being responsive to said RESET signal applied to its input terminal means for assuming a second of its stable states, and having output terminal means for supplying an output signal indicative of its state, and a dead-zone detection circuit responsive to an input signal for supplying said SET signal to said input terminal means when said input signal is outside of said dead-zone in a first sense and for supplying said RESET signal to said input terminal means when said input is outside of said dead-zone in a second sense opposite to said first sense.

12. The combination as claimed in claim 11 wherein:

a first and a second transistor having cross-coupled collector and base electrodes and common emitter electrodes are included in said bistable and a third and fourth transistors having their respective base electrodes connected to separate ones of the collector electrodes of said first and said second transistors and being further connected as an emitter-coupled differential amplifier voltage comparator are included in said means for coupling an output signal from said bistable.

13. The combination as claimed in claim 11 wherein said dead-zone detection circuit comprises:

a first voltage comparator for comparing an input signal level to a first reference level and providing said SET signal whenever the potential of said input signal is more positive than first reference level, and a second voltage comparator for comparing said input signal level to a second reference level and providing said RESET signal whenever the potential of said input signal is more negative than said second reference level.

* * * * *

Disclaimer 3,816,761.—*Adel Abdel Aziz Ahmed*, Clinton Township, county of Hunterdon, N.J. COMPARATOR CIRCUITRY. Patent dated June 11, 1974. Disclaimer filed Feb. 5, 1976, by the assignee, *RCA Corporation*.

Hereby enters this disclaimer to claim 11 of said patent.

[*Official Gazette March 23, 1976.*]